(12) United States Patent
Tsuruoka et al.

(10) Patent No.: US 11,127,425 B2
(45) Date of Patent: Sep. 21, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Masakazu Tsuruoka, Kanagawa (JP); Fumiya Kudo, Kanagawa (JP); Takao Abe, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/806,208

(22) Filed: Mar. 2, 2020

(65) Prior Publication Data

US 2021/0056989 A1 Feb. 25, 2021

(30) Foreign Application Priority Data

Aug. 22, 2019 (JP) .............................. JP2019-152029

(51) Int. Cl.
  *G11B 5/09* (2006.01)
  *G11B 5/55* (2006.01)
  *G11B 20/12* (2006.01)

(52) U.S. Cl.
  CPC ........ *G11B 5/5543* (2013.01); *G11B 20/1217* (2013.01); *G11B 2020/1238* (2013.01); *G11B 2020/1281* (2013.01)

(58) Field of Classification Search
  None
  See application file for complete search history.

(56) References Cited

U.S. PATENT DOCUMENTS

| | | | |
|---|---|---|---|
| 6,493,173 B1 | 12/2002 | Kim et al. | |
| 8,699,159 B1* | 4/2014 | Malina | G11B 20/10305 360/31 |
| 9,082,418 B2 | 7/2015 | Ong et al. | |
| 9,129,628 B1* | 9/2015 | Fallone | G11B 5/012 |
| 10,096,338 B2 | 10/2018 | Hasegawa et al. | |
| 10,176,849 B1* | 1/2019 | Qiang | G06F 3/0604 |
| 10,540,999 B1* | 1/2020 | Kawabe | G11B 5/012 |
| 2014/0019680 A1* | 1/2014 | Jin | G11B 5/012 711/112 |
| 2017/0090776 A1* | 3/2017 | Kowles | G06F 3/0655 |
| 2018/0342261 A1* | 11/2018 | Das | G06F 3/061 |
| 2019/0004739 A1 | 1/2019 | Tang et al. | |
| 2019/0198050 A1* | 6/2019 | Tagami | G11B 5/59627 |
| 2020/0125268 A1* | 4/2020 | Li | G06F 3/061 |

* cited by examiner

*Primary Examiner* — Peter Vincent Agustin
(74) *Attorney, Agent, or Firm* — White & Case LLP

(57) ABSTRACT

According to an embodiment, a magnetic disk device includes a magnetic disk including a first storage area and a second storage area different from the first storage area. In the second storage area, both of a first post code that is used to write user data in the first storage area by a first method and a second post code that is used to write user data in the first storage area by a second method are stored in advance. The first method is a method in which one track between two tracks adjacent to each other overlaps a part of the other track between the two tracks. The second method is a method in which two adjacent tracks do not overlap each other.

9 Claims, 9 Drawing Sheets

MAGNETIC DISK DEVICE

CROSS-REFERENCE TO RELATED APPLICATIONS

This application is based upon and claims the benefit of priority from Japanese Patent Application No. 2019-152029, filed on Aug. 22, 2019; the entire contents of which are incorporated herein by reference.

FIELD

Embodiments described herein relate generally to a magnetic disk device.

BACKGROUND

In recent years, a technique called shingled magnetic recording (SMR) has been developed as a recording method for magnetic disks.

According to SMR, when data is written to a magnetic disk, data of the next track is written so as to overlap a part of data of one track which has been already written. As a result, a track width (track pitch) can be made narrower than a width of a write element, thereby improving recording density.

As compared with SMR, a conventional writing method in which data of two adjacent tracks are arranged so as not to overlap each other is called conventional magnetic recording (CMR). According to CMR, random access performance is higher as compared with SMR.

DETAILED DESCRIPTION

According to the present embodiment, a magnetic disk device includes a magnetic disk including a first storage area and a second storage area different from the first storage area. In the second storage area, both of a first post code that is used to write user data in the first storage area by a first method and a second post code that is used to write user data in the first storage area by a second method are stored in advance. The first method is a method in which one track between two tracks adjacent to each other overlaps a part of the other track between the two tracks. The second method is a method in which two adjacent tracks do not overlap each other.

Hereinafter, the magnetic disk device according to the embodiment will be described in detail with reference to the attached drawings. Incidentally, the present invention is not limited to the embodiment.

Embodiment

Figure 1:
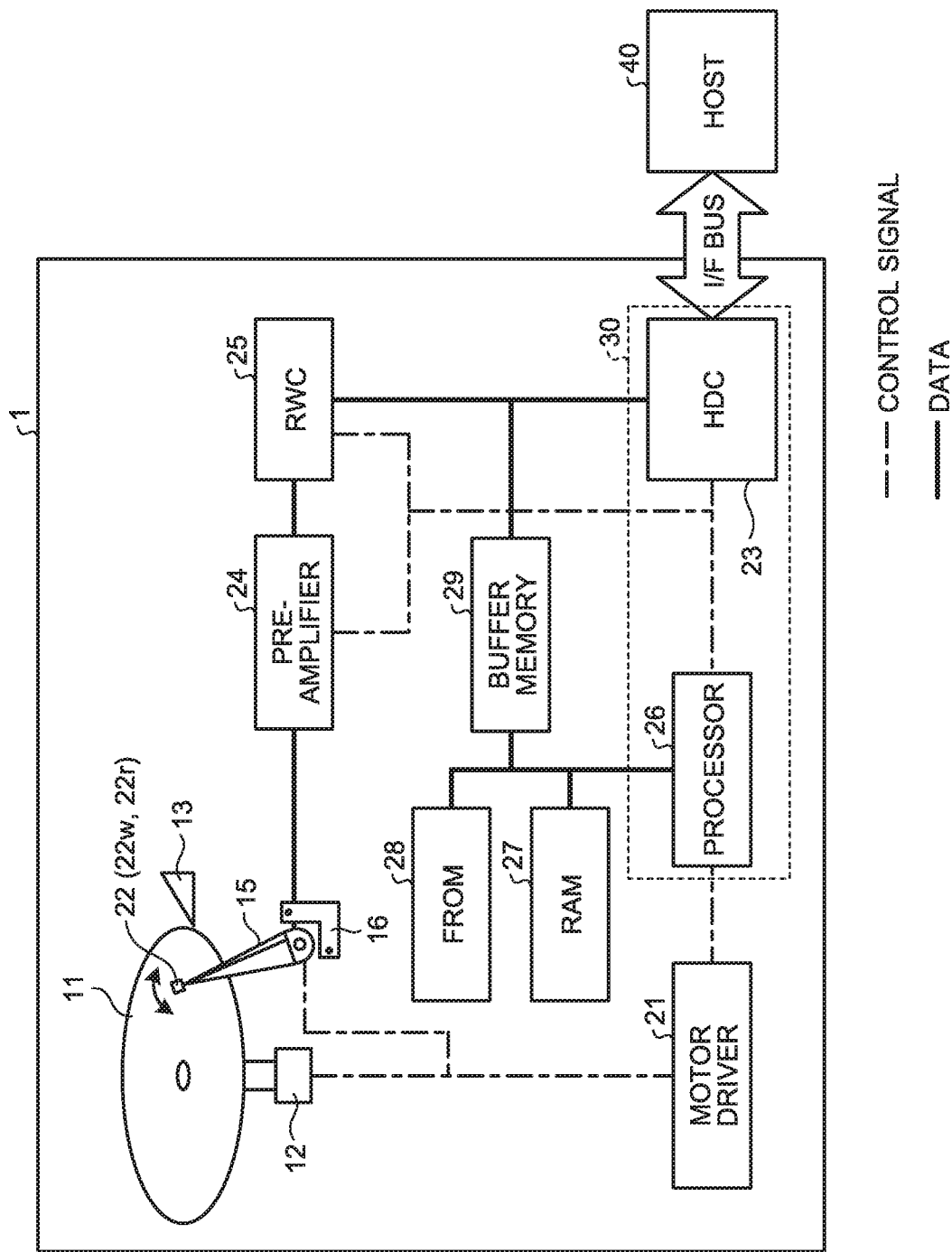
FIG. 1 is a diagram illustrating an example of a configuration of a magnetic disk device of an embodiment.

FIG. 1 is a diagram illustrating an example of a configuration of a magnetic disk device 1 of the embodiment.

The magnetic disk device 1 is connected to a host 40. The magnetic disk device 1 can receive an access command such as a write command and a read command from the host 40. In addition, the magnetic disk device 1 can receive a command that requests switching of a recording method in addition to the access command. The recording methods and the switching of the recording method will be described later.

The magnetic disk device 1 includes a magnetic disk 11. The magnetic disk device 1 writes data to the magnetic disk 11 or reads data from the magnetic disk 11 in response to the access command.

The write and read of data are performed via a magnetic head 22. Specifically, the magnetic disk device 1 includes not only the magnetic disk 11 but also a spindle motor 12, a motor driver 21, the magnetic head 22, an actuator arm 15, a voice coil motor (VCM) 16, a ramp 13, a preamplifier 24, a read/write channel (RWC) 25, a hard disk controller (HDC) 23, a buffer memory 29, and a processor 26.

The magnetic disk 11 is rotated by the spindle motor 12 at a predetermined rotational speed about a rotation axis. The rotation of the spindle motor 12 is driven by the motor driver 21.

The magnetic head 22 writes and reads data to and from the magnetic disk 11 by a write element 22w and a read element 22r provided therein. The magnetic head 22 is attached to a distal end of the actuator arm 15. The magnetic head 22 is moved along the radial direction of the magnetic disk 11 by the VCM 16 driven by the motor driver 21. When the rotation of the magnetic disk 11 is stopped or the like, the magnetic head 22 is moved onto the ramp 13.

The preamplifier 24 amplifies a signal read from the magnetic disk 11 by the magnetic head 22 when reading data from the magnetic disk 11 and outputs the amplified signal to be supplied to the RWC 25. In addition, the preamplifier 24 amplifies a signal corresponding to write data supplied from the RWC 25 and supplies the amplified signal to the magnetic head 22.

The HDC 23 performs control of data transmission and reception performed with the host 40 via an I/F bus, control of the buffer memory 29, error correction of read data, and the like.

The buffer memory 29 is used as a buffer of data to be transmitted to and received from the host 40. For example, the buffer memory 29 is used for temporarily storing data which is to be written to the magnetic disk 11.

The buffer memory 29 is configured using, for example, a volatile memory that can operate at high speed. A type of the memory constituting the buffer memory 29 is not limited to a specific type. The buffer memory 29 may be configured using, for example, a dynamic random access memory (DRAM) or a static random access memory (SRAM).

The RWC 25 performs code modulation of write data supplied from the HDC 23 and supplies the modulated data to the preamplifier 24. In addition, the RWC 25 performs code demodulation of a signal read from the magnetic disk 11 and supplied from the preamplifier 24 and outputs the demodulated signal as digital data to the HDC 23.

The processor 26 is, for example, a central processing unit (CPU). A RAM 27, a flash read only memory (FROM) 28, and the buffer memory 29 are connected to the processor 26.

The RAM 27 is configured using, for example, DRAM or SRAM. The RAM 27 is used as an operation memory by the processor 26. The RAM 27 is used for an area in which firmware (program data) is loaded and an area in which various types of management data are stored.

The FROM 28 is an example of a nonvolatile memory. The processor 26 performs overall control of the magnetic disk device 1 according to firmware stored in the FROM 28 and the magnetic disk 11 in advance. For example, the processor 26 loads firmware stored in advance in the FROM 28 and the magnetic disk 11 into the RAM 27, and executes control of the motor driver 21, the preamplifier 24, the RWC 25, the HDC 23, and the like according to the loaded firmware.

Incidentally, the configuration including the processor 26 and the HDC 23 may also be regarded as a control circuit 30. The control circuit 30 may include other elements such as the RAM 27, the FROM 28, the buffer memory 29, and the RWC 25.

Figure 2:
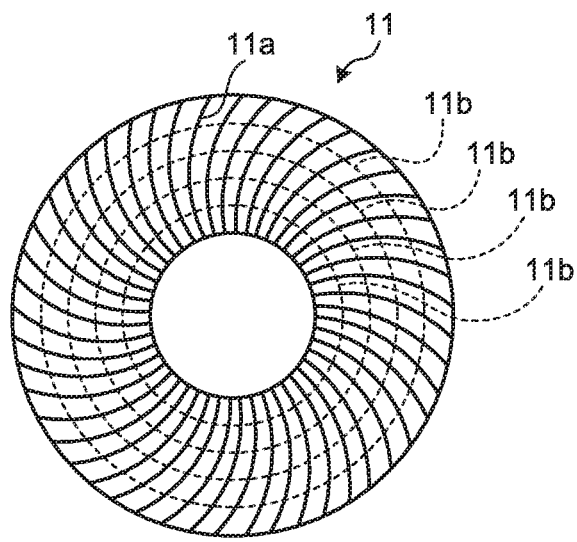
FIG. 2 is a view illustrating an example of a configuration of a magnetic disk according to the embodiment.

FIG. 2 is a view illustrating an example of a configuration of the magnetic disk 11 according to the embodiment. Servo information is written in a magnetic layer formed on a surface of the magnetic disk 11 by a servo writer or the like before shipment, for example. The servo information includes sector/cylinder information or a burst pattern. The sector/cylinder information can give servo addresses in the circumferential direction and the radial direction of the magnetic disk 11, and can be used for seek control to move the magnetic head 22 to a target track. The burst pattern can be used for tracking control to position the magnetic head 22 within a range of the target track. Incidentally, the servo information may be written in the magnetic disk 11 after shipment by self-servo write (SSW). FIG. 2 illustrates servo zones 11a arranged radially as an example of the arrangement of servo zones in which servo information is written. In the radial direction of the magnetic disk 11, a plurality of concentric tracks 11b are provided at a predetermined pitch. A number of sectors are continuously formed on the circumference of each of the tracks 11b. Data write and read are executed for each sector by the magnetic head 22.

SMR and CMR are prepared as methods for writing data to the magnetic disk 11 (recording methods).

Figure 3:
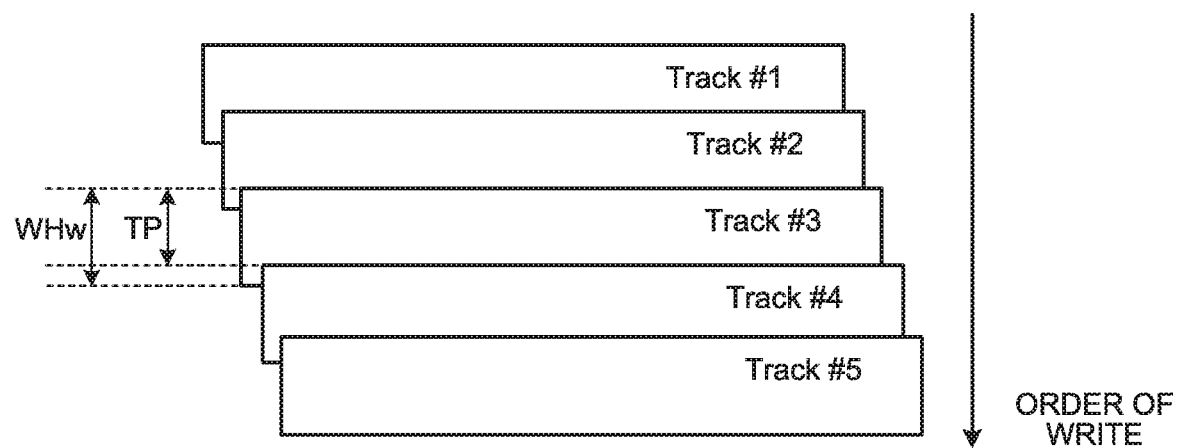
FIG. 3 is a schematic view for describing an SMR method of the embodiment.

FIG. 3 is a schematic view for describing the SMR method of the embodiment. SMR is a method in which, when write of data (denoted as first data) of a track is executed and then write of data (denoted as second data) of a new track adjacent to the track in the radial direction is executed, data of each of the two tracks are written such that the second data overlaps a part of the first data. That is, according to SMR, data of one track between two tracks adjacent to each other in the radial direction of the magnetic disk 11 is written so as to overlap a part of data of the other track between the two tracks.

For example, a part of data of Track #2 overlaps data of Track #1. Also, a part of data of Track #3 overlaps the data of Track #2. That is, the overlapping of data of one track with a part of data of an adjacent track to which data has already been written is repeated according to SMR.

As a result, a width of each track (equal to a track pitch TP) is made narrower than a core width (WHw) of the write element 22w of the magnetic head 22. As a result, the recording density is improved. That is, the storage capacity can be increased by SMR as compared with CMR to be described later.

However, if a part of data of a plurality of tracks is updated according to SMR, data of a track adjacent to the updated data is destroyed since the track pitch TP is narrower than the core width WHw of the write element 22w. In order to prevent the destruction of data, data of a plurality of tracks including the data of the updated part are updated in a batch according to SMR. An area of the plurality of tracks that are updated in a batch may be referred to as a zone or a band. Since the updating method as described above is performed according to SMR, random access performance is inferior to that of CMR to be described later.

Figure 4:
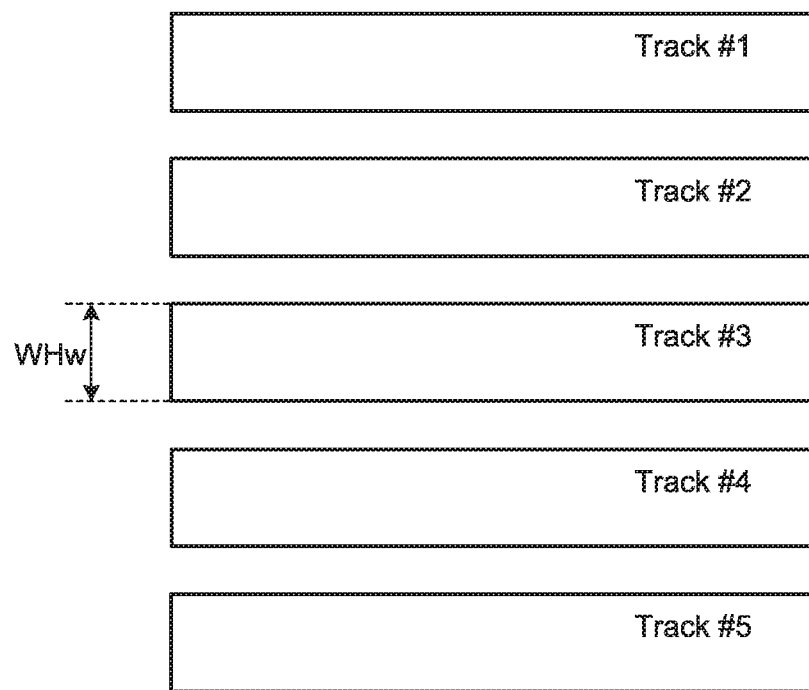
FIG. 4 is a schematic view for describing a CMR method of the embodiment.

FIG. 4 is a schematic view for describing the CMR method of the embodiment. As illustrated in this drawing, data of each track is arranged so as not to overlap data of adjacent tracks in the radial direction according to CMR. In other words, CMR is a writing method in which data of two tracks adjacent to each other in the radial direction of the magnetic disk 11 are written so as not to overlap each other. According to CMR, a width of each track is the same as the core width (WHw) of the write element 22w, and thus, data at an arbitrary position can be updated. Thus, according to CMR, the random access performance is high although the storage capacity is smaller than that of SMR.

In the embodiment, the magnetic disk device 1 is configured so as to be capable of not only writing data to the magnetic disk 11 by any method of SMR and CMR but also switching the recording method between SMR and CMR at each position of the magnetic disk 11.

Figure 5:
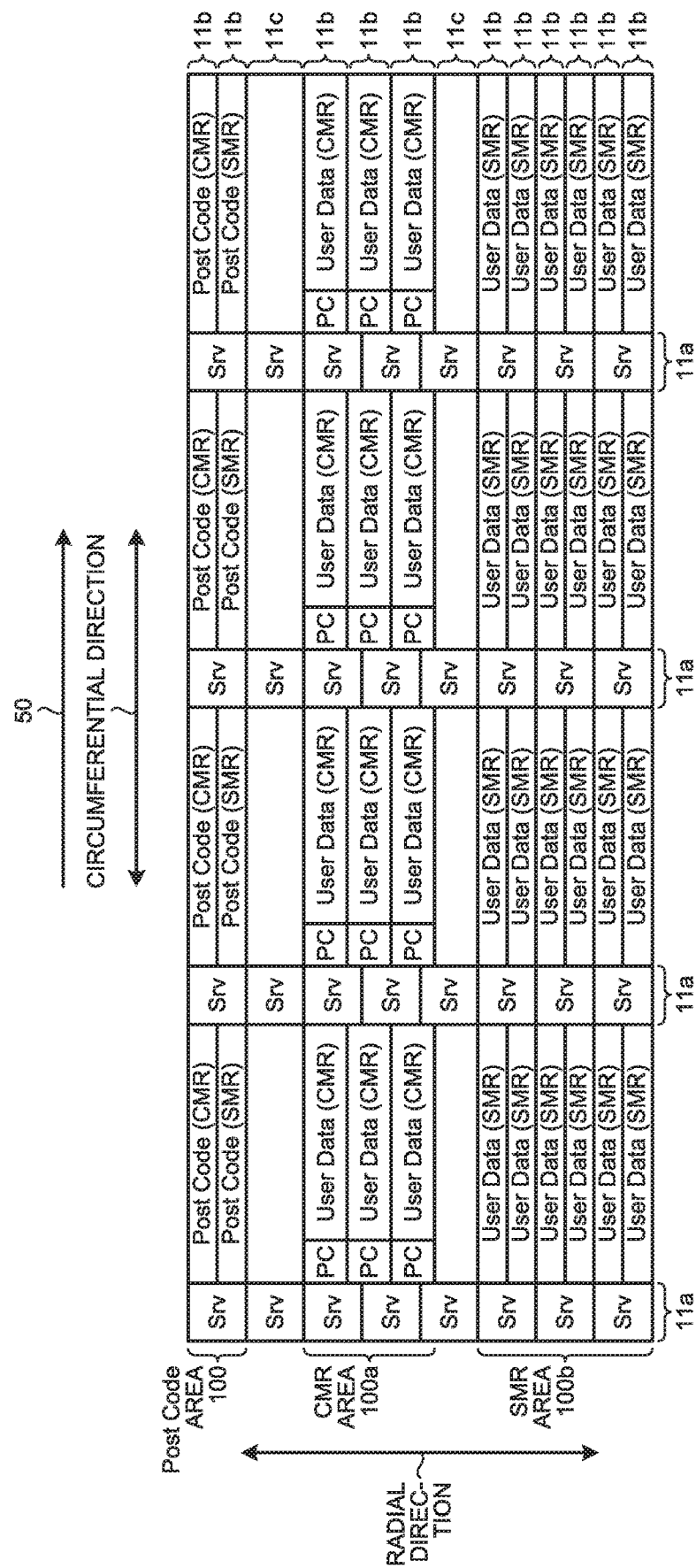
FIG. 5 is a schematic view for describing an example of allocation of storage areas set in the magnetic disk of the embodiment at a certain point in time.

FIG. 5 is a schematic view for describing an example of allocation of storage areas set in the magnetic disk 11 of the embodiment in a certain point in time. Incidentally, the magnetic head 22 is moved relative to the magnetic disk 11 in a direction indicated by an arrow 50 in this drawing. In addition, the four servo zones 11a are included in the circumferential direction in this drawing, but the number of the servo zones 11a included in the circumferential direction is not limited to four.

As illustrated in FIG. 5, a post code area 100, a CMR area 110a, and an SMR area 110b are arrayed in the radial direction in the magnetic disk 11. Each of the areas 100, 110a, and 110b is constituted by one or more tracks 11b. Guard areas 11c are provided at boundaries among the areas 100, 110a, and 110b. The guard areas 11c are areas in which data is not written.

An area constituting the CMR area 110a or the SMR area 110b is an example of a first storage area, and the post code area 100 is an example of a second storage area. Incidentally, two or more CMR areas 110a may be allocated in the magnetic disk 11. In addition, two or more SMR areas 110b may be allocated in the magnetic disk 11. In addition, the second storage area can be divided and arranged at different positions in the radial direction.

The post code area 100 stores post codes for CMR and post codes for SMR corresponding to at least the entire area of the magnetic disk 11 in which tracks can be set. The post code is information used for correcting servo information (Srv) written in the servo zone 11a.

Data is written in the CMR area 110a by the CMR method. A post code (PC) is written at a position subsequent to the servo zone 11a in each of the tracks 1b of the CMR area 110a. Then, user data is written at a position subsequent to the position where the post code has been written.

When the CMR area 110a is accessed (for writing or reading), first, servo information and a post code in an access target track 11b in the CMR area 110a are read by the magnetic head 22. Then, the servo information is corrected using the post code, and positioning of the magnetic head 22 is executed based on the corrected servo information, whereby access to the subsequent user data area is executed.

In the SMR area 110b, data is written by the SMR method. User data is written at a position subsequent to the servo zone 11a in each of the tracks 1b of the SMR area 110b. That is, no post code is written in each of the tracks 11b of the SMR area 110b.

When the SMR area 110b is accessed, first, a post code corresponding to an access target track 11b is read from the post code area 100 to the buffer memory 29. When a plurality of the tracks 11b are accessed, post codes corresponding to the plurality of tracks 11b are read in a batch. Then, servo information is read from the access target track 11b in the SMR area 110b, and the servo information is corrected using the post code which has been read and stored in the buffer memory 29. Then, the positioning of the magnetic head 22 is executed based on the corrected servo information.

Incidentally, since the post code is stored at a position (the post code area 100) away from the SMR area 110b, it is necessary to perform a total of two seeks, that is, a seek to a track in which the post code is stored and a seek to an access target track in the SMR area 110b, when performing random access to the SMR area 110b. This causes deterioration in random access performance. If the magnetic disk device 1 is operated with respect to the SMR area 110b so as to perform sequential access instead of random access as much as possible, post codes corresponding to a plurality of tracks, which are sequential access targets, can be read in a batch and used, and thus, it is possible to suppress a disadvantage of performance deterioration caused when no post code is stored in the SMR area 110b.

Figure 6:
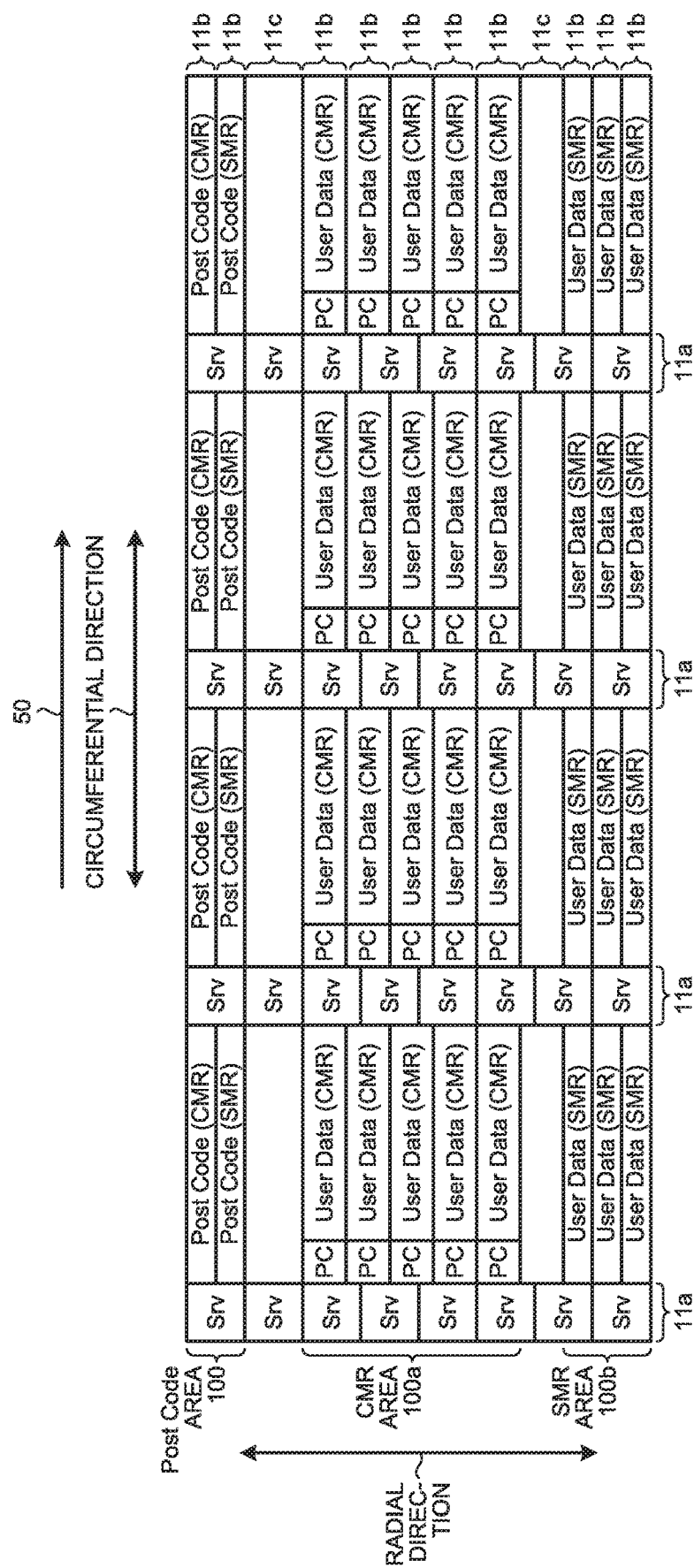
FIG. 6 is a schematic view for describing an example of allocation of storage areas set in the magnetic disk of the embodiment at another point in time.

FIG. 6 is a schematic view for describing an example of allocation of storage areas set in the magnetic disk 11 of the embodiment at another point in time.

When the allocation of the storage areas is changed from the state illustrated in FIG. 5 to the state illustrated in FIG. 6, the magnetic disk device 1 changes an area other than the CMR area 110a to the CMR area 110a, that is, performs reallocation. Here, the guard area 11c adjacent to the CMR area 110a on the SMR area 110b side and a part of the SMR area 110b are changed to the CMR area 110a, and two new tracks are added to the CMR area 110a.

A lot of time is required to generate a post code. Thus, if the magnetic disk device 1 is configured to generate post codes for two tracks when adding the two tracks to the CMR area 110a, the time required for switching of the recording method increases.

In the embodiment, post codes to be used for both cases, that is, the case where the CMR recording method is adopted and the case where the SMR recording method is adopted, are stored in the post code area 100 in advance. In the magnetic disk device 1, when a new track is added to the CMR area 110a, a post code for the new track is read from the post code area 100 and written in a position subsequent to the servo zone 11a of the new track. As a result, the time required to switch the recording method from SMR to CMR is suppressed.

In addition, when the allocation of the storage areas is changed from the state illustrated in FIG. 6 to the state illustrated in FIG. 5, the magnetic disk device 1 changes an area other than the SMR area 110b to the SMR area 110b. Here, the guard area 11c adjacent to the SMR area 110b on the CMR area 110a side and a part of the CMR area 110a are changed to the SMR area 110b.

As described above, the post code stored in the post code area 100 is used when accessing the SMR area 110b. Thus, a process of generating a post code or a process of reading a post code from the post code area 100 is unnecessary when adding a track to the SMR area 110b.

As described above, since it is not necessary to generate a post code when the recording method is switched between CMR and SMR, the time required for the switching is suppressed.

Incidentally, an example in which there is no restriction on a unit for changing the recording method has been described in FIGS. 5 and 6. The guard area 1c may be prohibited from being switched to either the CMR area 110a or the SMR area 110b, and a recording method may be changed for each area delimited by the guard area 1c. In addition, the change of the recording method may be executed for each unit area such as a zone or a band.

In general, frequencies of signals to be written to the magnetic disk 11 differ between servo information and user data. The frequency of the signal to be written to the magnetic disk 11 will be described with reference to FIGS. 7 to 9.

Figure 7:
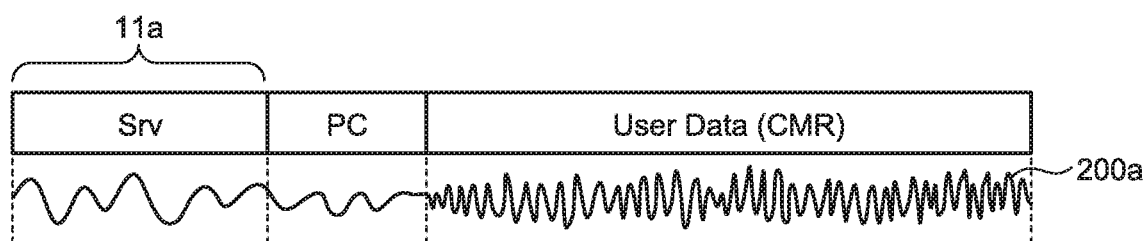
FIG. 7 is a schematic view for describing a frequency of a signal to be written in the CMR area of the embodiment.

FIG. 7 is a schematic view for describing a frequency of a signal to be written in the CMR area 110a of the embodiment. Reference sign 200a is an example of a waveform of the signal to be written in the CMR area 110a. From this drawing, it can be understood that the user data is written more densely than the servo information (Srv). That is, the frequency of the signal of the user data to be written to the magnetic disk 11 is higher than a frequency of a signal of the servo information to be written to the magnetic disk 11. The frequency of the signal of the servo information to be written to the magnetic disk 11 is denoted as a servo frequency. The servo frequency is an example of a first frequency. The frequency of the signal of the user data to be written to the magnetic disk 11 is denoted as a write frequency. The write frequency is an example of a second frequency.

Further, a post code is written at the same density as the servo information as illustrated in FIG. 7. That is, the post code is written at the servo frequency.

Figure 8:
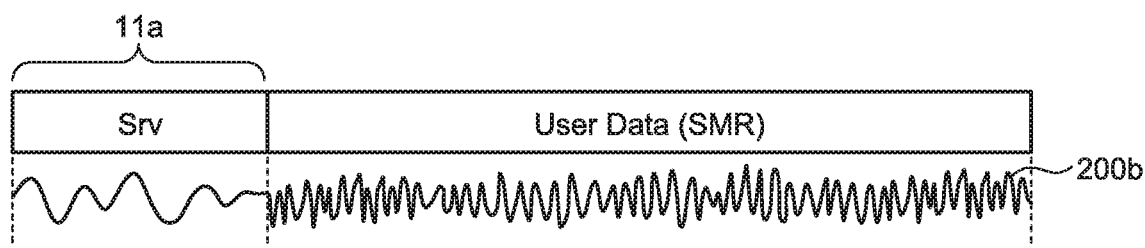
FIG. 8 is a schematic view for describing a frequency of a signal to be written in the SMR area of the embodiment.

FIG. 8 is a schematic view for describing a frequency of a signal to be written in the SMR area 110b of the embodiment. Reference sign 200b is an example of a waveform of the signal to be written in the SMR area 110b. As illustrated in this drawing, servo information is written at the servo frequency, and user data is written at the write frequency.

Figure 9:
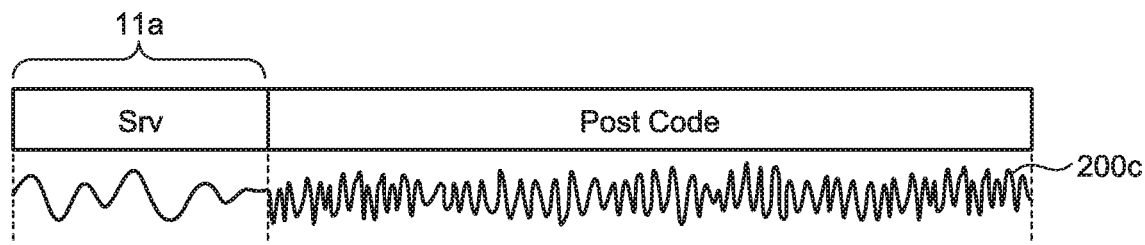
FIG. 9 is a schematic view for describing a frequency of a signal to be written in the post code area of the embodiment.

FIG. 9 is a schematic view for describing a frequency of a signal to be written in the post code area 100 of the embodiment. Reference sign 200c is an example of a waveform of the signal to be written in the post code area 100. As illustrated in this drawing, the post code is written at the write frequency in the post code area 100.

If it is configured such that a post code is written in the SMR area 110b, the post code is written in the SMR area 110b at the servo frequency similarly to the case of the CMR area 110a.

In the embodiment, since the post codes for the SMR area 110b are densely written in the post code area 100, the capacity allocated to the post codes for the SMR area 110b can be suppressed as compared with the case where the post codes are written in the SMR area 110b.

In addition, the SMR area 110b does not require an area for the post code, and thus, an area to be used for storage of user data can be increased as compared with the case where the SMR area 110b has the area for the post code.

That is, since the post codes for the SMR area 110b are written at the write frequency not in the SMR area 110b but in the post code area 100, format efficiency is improved.

Incidentally, SMR is an example of the first method. The first method is a method in which one track between two tracks adjacent to each other overlaps a part of the other track between the two tracks.

In addition, CMR is an example of the second method. The second method is a method in which two adjacent tracks do not overlap each other.

In addition, the post code for SMR stored in the post code area 100 is an example of the first post code. In addition, the post code for CMR stored in the post code area 100 is an example of the second post code.

Next, an operation of the magnetic disk device 1 of the embodiment will be described.

Figure 10:
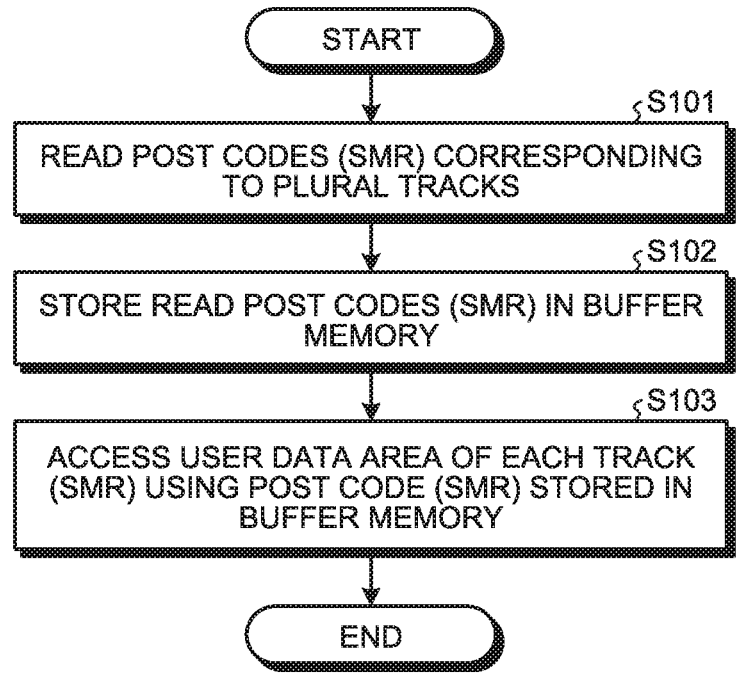
FIG. 10 is a flowchart illustrating an example of an operation of the magnetic disk device according to the embodiment when accessing the SMR area.

FIG. 10 is a flowchart illustrating an example of the operation of the magnetic disk device 1 according to the embodiment when accessing the SMR area 110b.

The control circuit 30 reads post codes corresponding to a plurality of tracks belonging to the SMR area 110b from the post code area 100 using the magnetic head 22 (S101). The control circuit 30 performs positioning of the magnetic head 22 onto the post code area 100, and then reads the post codes. In S101, post codes for all tracks belonging to the SMR area 110b may be read. Alternatively, post codes for some tracks including an access target track among the tracks belonging to the SMR area 110b may be read. Incidentally, the positioning means keeping the magnetic head 22 onto a target track for a time period of accessing to the target track. During the magnetic head 22 is being positioned onto a target track, position of the magnetic head 22 may vary within a range of the target track according to the tracking control.

The control circuit 30 stores the post codes corresponding to the plurality of tracks, which have been read in the process of S101, in the buffer memory 29 (S102).

Then, the control circuit 30 accesses the SMR area 110b using the post codes stored in the buffer memory for the plurality of tracks (S103).

In S103, the control circuit 30 reads servo information by the magnetic head 22, and corrects the servo information based on the post code stored in the buffer memory 29. Then, the control circuit 30 performs positioning of the magnetic head 22 based on the corrected servo information, thereby accessing a user data area subsequent to the servo zone 11a.

With S103, the operation of accessing the SMR area 110b is completed.

As described above, the control circuit 30 executes control to read the post code for SMR stored in the post code area 100 and correct the servo information using the read post code when accessing the SMR area 110b.

Figure 11:
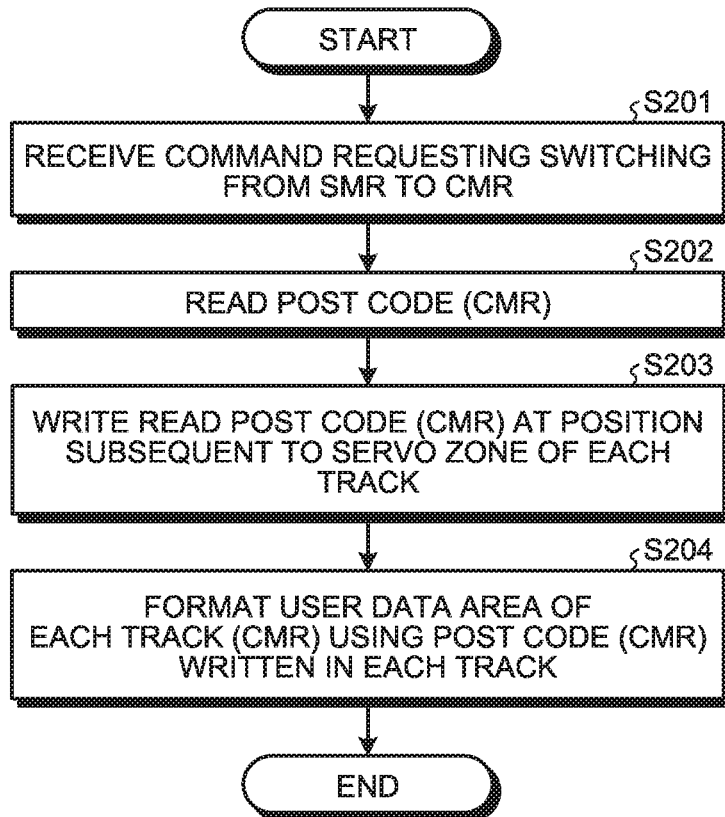
FIG. 11 is a flowchart illustrating an example of the operation of the magnetic disk device according to the embodiment when a recording method is switched from SMR to CMR.

FIG. 11 is a flowchart illustrating an example of the operation of the magnetic disk device 1 according to the embodiment when the recording method is switched from SMR to CMR. Here, it is assumed that switching can be executed for each predetermined unit area.

When receiving a command that requests switching from SMR to CMR (S201), the control circuit 30 causes the magnetic head 22 to read post codes for the CMR area 110a from the post code area 100 (S202).

Incidentally, the command requesting switching from SMR to CMR includes information indicating a range of a switching target. For example, the command includes information indicating a unit area of a switching target. The command can designate the unit area of the switching target by a position, a size, or a combination of the position and size of the unit area of the switching target. In S202, post codes for CMR corresponding to the designated unit area are read.

Subsequent to S202, the control circuit 30 causes the magnetic head 22 to write the read post code to a position subsequent to the servo zone 11a of each track of the unit area designated as the switching target (S203).

Incidentally, S202 and S203 may be repeatedly executed for each predetermined number of post codes. In S203, write of the post codes is executed by the CMR method.

When the write of the post codes to the unit area designated as the switching target is completed, the control circuit 30 formats an area for user data using the post code written in each track (S204).

In S204, the control circuit 30 reads servo information and a post code stored at a position subsequent to the servo information using the magnetic head 22, and corrects the servo information based on the post code. Then, the control circuit 30 positions the magnetic head 22 based on the corrected servo information, thereby executing the format of the area for user data.

With S204, the operation of switching the recording method from SMR to CMR is completed.

Incidentally, an operation similar to the operation illustrated in FIG. 11 may be performed even when the guard area is changed to the CMR area. In addition, the operation illustrated in FIG. 11 may also be applied to the case where there is no restriction on a unit for changing the recording method.

In this manner, when the switching of the recording method from SMR to CMR is instructed, the control circuit 30 executes control to read the post code for CMR from the post code area 100 and to write the read post code into the track arranged in the switching target area.

Figure 12:
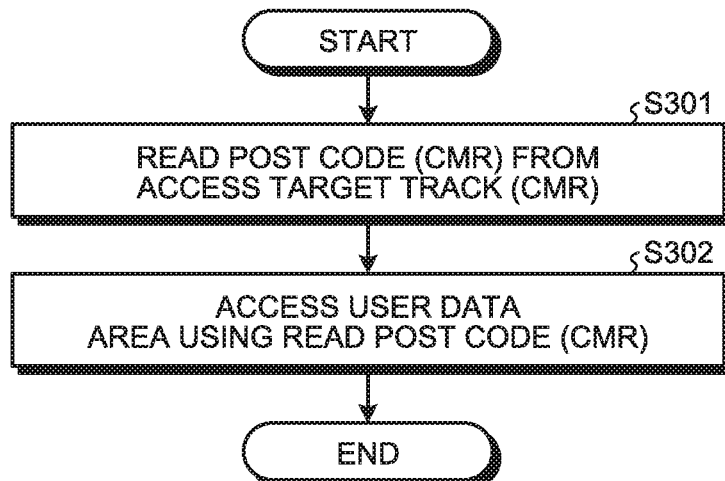
FIG. 12 is a flowchart illustrating an example of an operation of the magnetic disk device according to the embodiment when accessing the CMR area.

FIG. 12 is a flowchart illustrating an example of an operation of the magnetic disk device 1 according to the embodiment when accessing the CMR area 110a.

The control circuit 30 causes the magnetic head 22 to read a post code together with servo information from an access target track (S301). Then, the control circuit 30, using the read post code, accesses an area for user data subsequent to the area where the post code is stored (S302).

In S302, the control circuit 30 corrects the servo information read in the process of S301 based on the post code read in the process of S301. Then, the control circuit 30 accesses a user data area subsequent to the servo zone 11a by performing positioning of the magnetic head 22 based on the corrected servo information.

With S302, the operation of accessing the CMR area 110a is completed.

Figure 13:
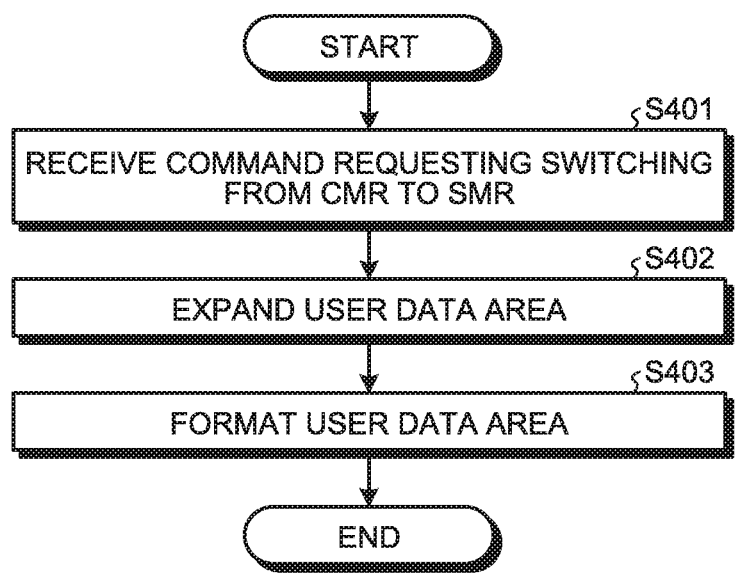
FIG. 13 is a flowchart illustrating an example of the operation of the magnetic disk device according to the embodiment when a recording method is switched from CMR to SMR.

FIG. 13 is a flowchart illustrating an example of the operation of the magnetic disk device 1 according to the embodiment when the recording method is switched from CMR to SMR. Here, it is assumed that switching can be executed for each predetermined unit area.

When receiving a command requesting switching from CMR to SMR (S401), in the CMR area 110a which is a switching target, the control circuit 30 changes an area where a post code has been written to an area for user data and expands each area for user data (S402).

Incidentally, the command requesting switching from CMR to SMR includes information indicating a range of the switching target. For example, the command includes information indicating a unit area of a switching target. The command can designate the unit area of the switching target by a position, a size, or a combination of the position and size of the unit area of the switching target. In S402, the control circuit 30 expands each area for user data included in the designated unit area.

Subsequent to S402, the control circuit 30 formats the area for user data to an area for SMR (S403). As a result, the post code for CMR which has been stored in each track of the switching target area is deleted, and the switching target area can be accessed by SMR.

With S403, the operation of switching the recording method from CMR to SMR is completed.

Incidentally, an operation similar to the operation illustrated in FIG. 13 may be performed even when the guard area is changed to the SMR area. In addition, the operation illustrated in FIG. 13 may also be applied to the case where there is no restriction on the unit for changing the recording method.

In this manner, when the switching of the recording method from CMR to SMR is instructed, the control circuit 30 executes control to delete the post code for CMR from the storage area of the switching target.

It is assumed in the above description that the switching of the recording method is executed in response to the command which is received from the host 40 to request the switching. The control circuit 30 may be configured to spontaneously execute the switching of the recording method without requiring the command from the host 40. For example, when the capacity of the SMR area 110b falls below a predetermined amount, the host 40 may increase the capacity of the SMR area 110b by switching the recording method for a partial area of the CMR area 110a.

The control circuit 30 serving as the controller may be configured to reallocate at least a partial area of the SMR area 110b to the CMR area 110a.

As described above, according to the embodiment, the magnetic disk 11 includes the post code area 100 in which both the post code that is used to write user data in the storage area of the magnetic disk 11 by the SMR method and the post code that is used to write user data in the storage area by CMR method are stored in advance.

Thus, when switching the recording method between SMR and CMR, it is possible to omit a process of generating a post code. Since the time required for switching the recording method between SMR and CMR can be suppressed, the recording method can be switched at high speed.

In addition, the magnetic disk device 1 further includes the control circuit 30 serving as the controller. The control circuit 30 executes control to read the post code for SMR stored in the post code area 100 and correct the servo information using the read post code when accessing the SMR area 110b which is the storage area for which SMR is set as the recording method.

Thus, the SMR area 110b does not require the area for storing the post codes, and thus, an area to be used for storage of user data can be increased as compared with the case where the post codes are stored in the SMR area 110b.

In addition, when the switching of the recording method from SMR to CMR is instructed, the control circuit 30 executes control to read the post codes for CMR from the post code area 100 and to write the read post codes into each track in the storage area of the switching target.

Thus, when the recording method is switched from SMR to CMR, it is not necessary to generate post codes, and it is possible to suppress the time required for switching the recording method from SMR to CMR.

Incidentally, while the servo information is written in the magnetic disk 11 at the servo frequency, the post codes for SMR and the post codes for CMR are written in the post code area 100 at the write frequency higher than the servo frequency. The control circuit 30 executes control to write the post code for CMR, which are read from the post code area 100, in each track in the storage area of the switching target at the servo frequency.

Further, when the switching of the recording method from CMR to SMR is instructed, the control circuit 30 executes control to delete the post code for CMR from the storage area of the switching target.

Even when the recording method is switched from the CMR to the SMR, it is not necessary to generate a post code, and thus, it is possible to suppress the time required for switching the recording method from the CMR to the SMR.

In addition, the control circuit 30 is configured as described above, and thus, executes the following characteristic operations with respect to the control of the magnetic head 22 when accessing the first storage area. That is, at a first point in time, for example, at a time when SMR is set as a writing method of user data to a certain storage area (first storage area), the control circuit 30 moves the magnetic head 22 onto the post code area 100 and then moves the magnetic head 22 onto the first storage area, when accessing the first storage area. In addition, at a second point in time different from the first point in time, for example, at a time when CMR is set as a writing method of user data to the first storage area, the control circuit 30 moves the magnetic head 22 onto the first storage area without moving the magnetic head 22 onto the post code area 100, when accessing the first storage area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk,
   wherein the magnetic disk includes:
   a first storage area; and
   a second storage area different from the first storage area,
     the second storage area storing both of a first post code
     that is used to write user data in the first storage area by a first method and a second post code that is used to write user data in the first storage area by a second method, the first method being a writing method in which data of one track between two tracks adjacent to each other in a radial direction of the magnetic disk is written so as to overlap a part of data of the other track between the two tracks, the second method being a writing method in which data of two tracks adjacent to each other in the radial direction of the magnetic disk are written so as not to overlap each other.

2. The magnetic disk device according to claim 1, further comprising
a controller,
wherein, when accessing the first storage area in a case where the first method is set as a method of writing the user data to the first storage area, the controller executes control to read the first post code stored in the second storage area and to perform correction of servo information using the read first post code.

3. The magnetic disk device according to claim 2, wherein when switching from the first method to the second method is requested, the controller executes control to read the second post code stored in the second storage area and to write the read second post code to a track in the first storage area.

4. The magnetic disk device according to claim 3, wherein
the magnetic disk includes servo information which is written in the magnetic disk at a first frequency,
the first post code and the second post code are written in the second storage area at a second frequency higher than the first frequency, and
the controller executes control to write the second post code read from the second storage area in each track in the first storage area at the first frequency.

5. The magnetic disk device according to claim 4, wherein the second frequency is equal to a frequency for write of the user data.

6. The magnetic disk device according to claim 3, wherein when switching from the second method to the first method is requested, the controller executes control to delete the second post code written in each track of the first storage area.

7. The magnetic disk device according to claim 1, wherein
the magnetic disk includes servo information which is written in the magnetic disk at a first frequency, and
the first post code and the second post code are written in the second storage area at a second frequency higher than the first frequency.

8. The magnetic disk device according to claim 7, wherein the second frequency is equal to a frequency for write of the user data.

9. A magnetic disk device comprising:
a magnetic disk including a first storage area; and a second storage area different from the first storage area, and wherein
the second storage area stores both of a first post code that is used to write user data in the first storage area by a first method and a second post code that is used to write user data in the first storage area by a second method, the first method being a writing method in which data of one track between two tracks adjacent to each other in a radial direction of the magnetic disk is written so as to overlap a part of data of the other track between the two tracks, the second method being a writing method in which data of two tracks adjacent to each other in the radial direction of the magnetic disk are written so as not to overlap each other.

* * * * *